US012650005B2

(12) United States Patent
Danguchi et al.

(10) Patent No.: US 12,650,005 B2
(45) Date of Patent: Jun. 9, 2026

(54) WORK VEHICLE

(71) Applicant: Yanmar Holdings Co., Ltd., Osaka (JP)

(72) Inventors: Masashi Danguchi, Fukuoka (JP); Shogo Suzuki, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 195 days.

(21) Appl. No.: 18/031,005

(22) PCT Filed: Aug. 31, 2021

(86) PCT No.: PCT/JP2021/031938
§ 371 (c)(1),
(2) Date: Apr. 9, 2023

(87) PCT Pub. No.: WO2022/080026
PCT Pub. Date: Apr. 21, 2022

(65) Prior Publication Data
US 2023/0407600 A1     Dec. 21, 2023

(30) Foreign Application Priority Data
Oct. 12, 2020    (JP) ................................. 2020-171621

(51) Int. Cl.
| | |
|---|---|
| *G06T 7/10* | (2017.01) |
| *E02F 9/24* | (2006.01) |
| *E02F 9/26* | (2006.01) |
| *G06T 7/70* | (2017.01) |

(52) U.S. Cl.
CPC ................. *E02F 9/26* (2013.01); *E02F 9/24* (2013.01); *G06T 7/10* (2017.01); *G06T 7/70* (2017.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 2016/0176338 A1* | 6/2016 | Husted | .................... | B60Q 9/008 |
| | | | | 340/435 |
| 2018/0258616 A1* | 9/2018 | Kiyota | ....................... | G06T 1/00 |
| 2022/0298756 A1* | 9/2022 | Eguchi | .................... | E02F 9/261 |

FOREIGN PATENT DOCUMENTS

| | | | | | | |
|---|---|---|---|---|---|---|
| JP | 2008163719 | A | * | 7/2008 | | |
| JP | 5082086 | B2 | * | 11/2012 | | |
| JP | 2017046277 | A | | 3/2017 | | |
| JP | 6134668 | B2 | * | 5/2017 | .......... | G01S 13/931 |
| JP | 2020012323 | A | | 1/2020 | | |

\* cited by examiner

*Primary Examiner* — Peter D Nolan
*Assistant Examiner* — Matthew Cobb
(74) *Attorney, Agent, or Firm* — Chris Mizumoto

(57) ABSTRACT
Provided is a work vehicle such as a hydraulic shovel comprising a monitoring unit that monitors the surroundings of the work vehicle, and a display unit that displays an image acquired by the monitoring unit. The display unit has an image display area in which the image is displayed, and an alarm information display area in which alarm information indicating the presence of an obstacle is displayed when the monitoring unit detects the presence of the obstacle. In the display unit, the alarm information display area is located outside the image display area.

8 Claims, 6 Drawing Sheets

WORK VEHICLE

CROSS-REFERENCE

This application is a US National Stage Application under 35 U.S.C. § 371 of International Application No. PCT/JP2021/031938 filed Aug. 31, 2021, which claims foreign priority of JP2020-171621 filed Oct. 12, 2020 and the disclosures of which are hereby incorporated by reference in their entirety.

TECHNICAL FIELD

The present invention relates to a work vehicle.

BACKGROUND ART

Various monitoring systems have been proposed to monitor a state around a work vehicle such as an excavator. For example, Patent Literature 1 discloses a system which captures images of a state around the excavator, displays the captured images on a display, as well as highlights the areas of people in the above mentioned images by surrounding them with a frame line.

CITATION LIST

Patent Literature

Patent Literature 1: Japanese Patent Laid-open Publication No. 2017-101420

DISCLOSURE OF INVENTION

Problems to be Solved by the Invention

However, in a configuration where the captured image and the frame line are superimposed and displayed on the display unit, as disclosed in Patent Literature 1, it is difficult to see because multiple pieces of information are superimposed. In addition, if the human in the image is very small compared to the entire image, the frame line surrounding the human in the image is much smaller than the entire image. This makes it difficult for the operator (driver) of the work vehicle to intuitively detect the presence of an obstacle around the work vehicle by looking at the display. As a result, it is difficult for the operator to detect hazard such as collision between the work vehicle and the obstacle.

The present invention has been made to solve the above mentioned problem, and an object of the present invention is to provide a work vehicle capable of easily letting an operator of the work vehicle intuitively know the presence of an obstacle around the work vehicle when looking at the display, thereby easily letting the operator know danger such as a collision between the work vehicle and the obstacle.

Means for Solving the Problems

According to one aspect of the present invention, a work vehicle is provided, which includes: a monitoring unit that captures an image around the work vehicle and detects whether or not an obstacle is present around the work vehicle, thereby to monitor a state around the work vehicle; and a display unit to display the image obtained by the monitoring unit, wherein the display unit has: an image display area that displays the image; and an alarm information display area that displays alarm information indicating a presence of the obstacle when the monitoring unit detects that the obstacle is present, the alarm information display area is located outside the image display area in the display unit.

Effect of the Invention

According to the above configuration, in the display unit, the alarm information display area is located outside the image display area, so that the alarm information indicating the presence of the obstacle can be clearly and largely displayed outside the image display area. This makes it easy for the operator of a work vehicle looking at the display to intuitively and easily know the presence of the obstacle around the work vehicle, and makes it easy for the operator to know danger such as a collision between the work vehicle and an obstacle.

DESCRIPTION OF EMBODIMENTS

Now, an embodiment of the present invention is described below with reference to the drawings.

1. Work Vehicle

Figure 1:
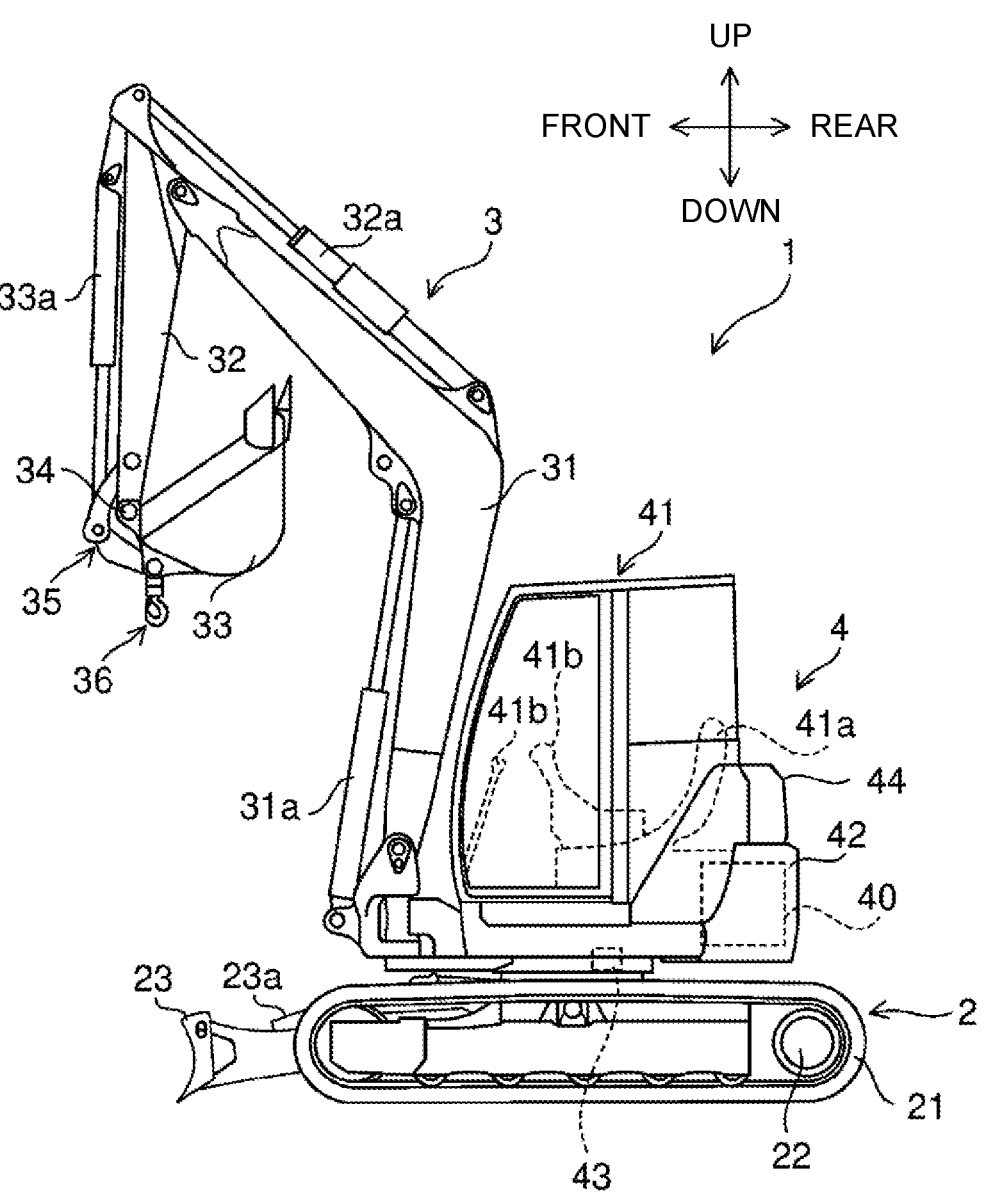
FIG. 1 is a side view illustrating a schematic configuration of a hydraulic excavator which is an example of a work vehicle according to an embodiment of the present invention.

FIG. 1 is a side view showing a schematic configuration of a hydraulic excavator 1 which is an example of a work vehicle according to the present embodiment. The hydraulic excavator 1 includes a lower traveling body 2, a work machine 3, and an upper revolving body 4.

Here, in FIG. 1, directions are defined as follows. First, the direction in which the lower traveling body 2 travels straight ahead is defined as a front-rear direction, one and other sides thereof are defined as "front" and "rear", respectively. In FIG. 1, a blade 23 side with respect to a traveling motor 22 is exemplarily shown as "front". In addition, a horizontal direction perpendicular to the front-rear direction is defined as a left-right direction. In this instance, as viewed from an operator sitting at an operator's seat 41a, left and right sides are defined as "left" and "right", respectively. Furthermore, a direction of gravity perpendicular to the front-rear and left-right directions is defined as a vertical direction, and upstream and downstream sides of the direction of gravity are defined as "up" and "down", respectively.

The lower traveling body 2 is driven by power from an engine 40 to cause the hydraulic excavator 1 to travel. The lower traveling body 2 is equipped with a pair of crawlers 21 on each side and a pair of traveling motors 22 on each side. Each of the traveling motors 22 is a hydraulic motor. The traveling motors 22 on each side drive the crawlers 21 on each side, respectively, and it allows the hydraulic excavator 1 to move forward and backward. The lower traveling body 2 is provided with the blade 23 for performing ground leveling work, and a blade cylinder 23a. The blade cylinder 23a is a hydraulic cylinder to rotate the blade 23 in the vertical direction.

The work machine 3 is driven by power from an engine 40 and performs excavation work to dig out earth and sand. The work machine 3 has a boom 31, an arm 32, and a bucket 33. The boom 31, arm 32, and bucket 33 can be driven independently to perform digging operations.

The boom 31 is rotated by a boom cylinder 31a. A base end portion of the boom cylinder 31a is supported by a front portion of the upper revolving body 4 and the boom cylinder can move in a freely extendable manner. The arm 32 is rotated by an arm cylinder 32a. A base end portion of the arm cylinder 32a is supported by a tip of the boom 31 and the arm cylinder can move in a freely extendable manner. The bucket 33 is rotated by a bucket cylinder 33a. A base end portion of the bucket cylinder 33a is supported by a tip of the arm 32 and the bucket cylinder can move in a freely extendable manner. Each of the boom cylinder 31a, the arm cylinder 32a, and the bucket cylinder 33a is composed of a hydraulic cylinder.

The bucket 33 is a container-like component with claws for digging, located at the tip of the work machine 3. The bucket 33 is pivotably attached to the tip of the arm 32 via a pin 34. In addition, the bucket 33 is connected to the bucket cylinder 33a via a link mechanism 35.

A hook 36 for crane work is attached to the tip of arm 32. The hook 36 is a hook-shaped member for the crane work and is pivotably attached to the link mechanism 35. Here, the crane work refers to lifting work in which an object to be worked is lifted up or down. The hook 36 is pivotably supported by the shaft of the link mechanism 35 as a turning fulcrum, and can change its posture between an extending state (see FIG. 1) where the hook extends from the bucket 33 and a retracting state (not shown) where the hook retracts to the bucket 33 side. For example, when performing excavation work with the bucket 33, the hook 36 comes to be in the retracting state. On the other hand, when performing the crane work with the hook 36, the hook 36 comes to be in the extending state.

The upper revolving body 4 is configured to be revolvable relative to the lower traveling body 2 via a swing bearing (not shown). An operation section 41, a revolving table 42, a revolving motor 43, an engine room 44, etc. are arranged in the upper revolving body 4. The upper revolving body 4 is driven by the revolving motor 43 which is a hydraulic motor to revolve via the swing bearing. At the rear portion of the upper revolving body 4, there are arranged a plurality of hydraulic pumps P0 (see FIG. 2), as well as the engine 40 to provide power to various parts.

Each of the hydraulic pumps P0 supplies hydraulic oil (pressure oil) to a hydraulic motor (e.g., right and left traveling motors 22 and the revolving motor 43) and a hydraulic cylinder (e.g., the blade cylinder 23a, the boom cylinder 31a, the arm cylinder 32a, the bucket cylinder 33a). The hydraulic motor and the hydraulic cylinder, which are driven with the hydraulic oil supplied from any of the hydraulic pumps P0, are collectively referred to as a hydraulic actuator AC (see FIG. 2).

An operator's seat 41a on which the operator rides is located in the operation section 41. A manipulation unit 41b is placed around the operator's seat 41a (especially forward, left and right side).

The manipulation unit 41b consists of an operation lever, a switch, a button, etc. to drive the hydraulic actuator AC. Sitting on the operator's seat 41a and operating the manipulation unit 41b, the operator can actuate the hydraulic actuator AC. This allows the operator to perform the traveling of the lower traveling body 2, the ground leveling work by the blade 23, the excavation work and crane work by the work machine 3, and the revolving of the upper revolving body 4, etc.

2. Configuration of Main Part of Hydraulic Excavator

Figure 2:
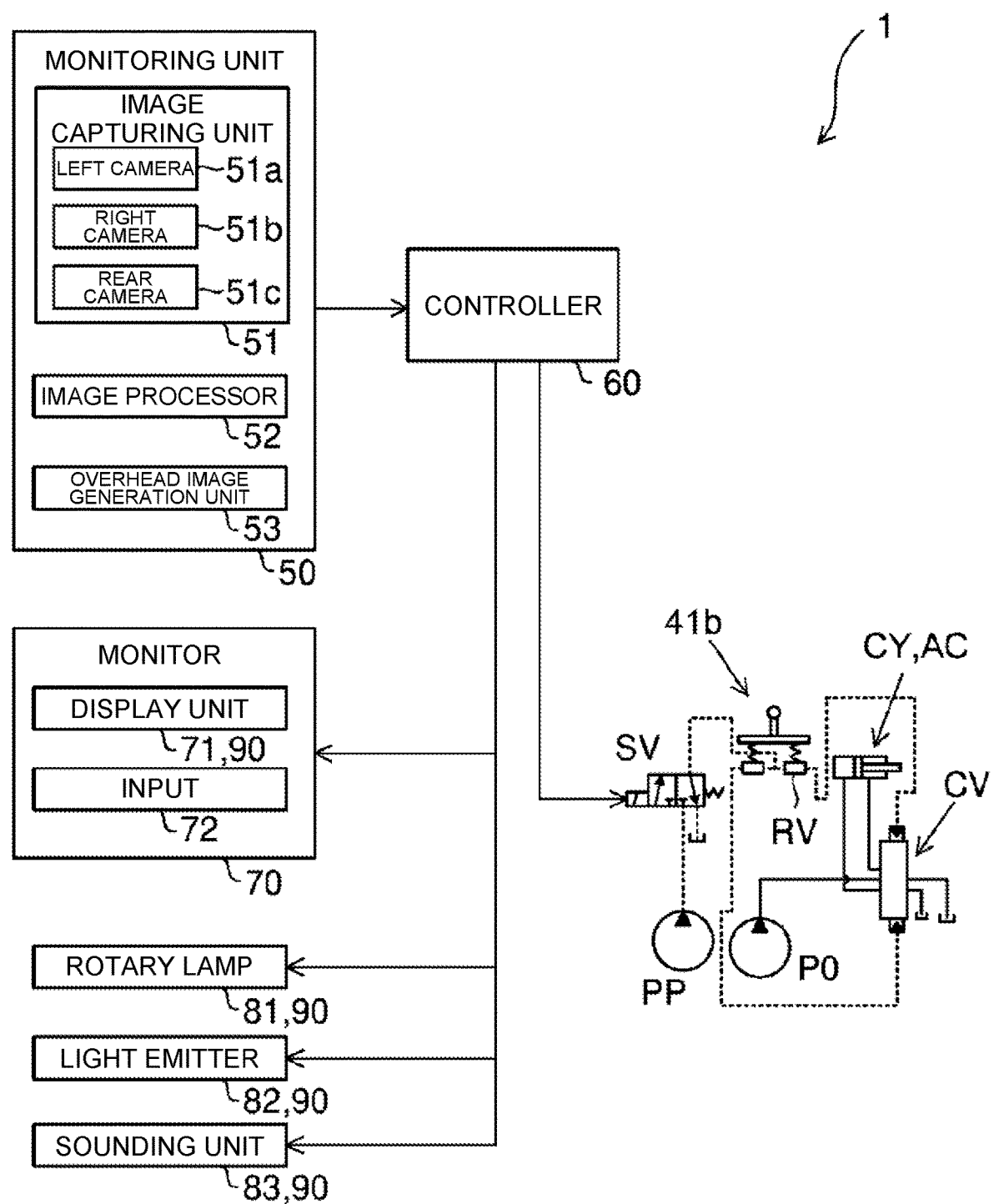
FIG. 2 is an explanatory diagram illustrating a configuration of a main part of the hydraulic excavator.

FIG. 2 schematically shows a configuration of a main part of the hydraulic excavator 1. The hydraulic excavator 1 further includes a monitoring unit 50, a controller 60, a monitor 70, a rotary lamp 81, a light emitter 82, and a sounding unit 83.

2-1. Monitoring Unit

The monitoring unit 50 detects whether or not an obstacle is present around the hydraulic excavator 1, thereby to monitor a state therearound. The obstacle may include an object to be monitored, such as a human, an object, or an animal. Namely, the hydraulic excavator 1 is provided with the monitoring unit 50 to monitor the state around the hydraulic excavator 1. In the present embodiment, the monitoring unit 50 captures an image around the hydraulic excavator 1 and detects whether or not the obstacle is present around the hydraulic excavator 1, thereby to monitor the state around the hydraulic excavator 1. Explained more specifically, the monitoring unit 50 has the following configuration.

The monitoring unit 50 has an image capturing unit 51, an image processor 52, and an overhead image generation unit 53. The image capturing unit 51 includes a right camera 51a, a left camera 51b, and a rear camera 51c, which capture images of a right side, left side, and rear of the hydraulic excavator 1, respectively. In other words, the monitoring unit 50 has the image capturing unit 51 to capture the images. Furthermore, the image capturing unit 51 includes a plurality of cameras (right camera 51a, left camera 51b, and rear camera 51c) which capture images around the hydraulic excavator 1. The image capturing unit 51 captures a moving image, for example, but it may capture a still image at a predetermined frame cycle.

The image processor 52 performs image recognition processing on an image (e.g., a right side image) captured by the image capturing unit 51 as an input, thereby to detect whether an object in the above mentioned image is an obstacle and a type of the obstacle (human/object/animal) and detect objects invading into a monitoring area. Namely, the monitoring unit 50 has an image processor 52 to detect whether or not the obstacles is present around the hydraulic excavator 1 by performing the image recognition processing on the images captured by the image capturing unit 51. The image processor 52 further detects the type of obstacle by means of the above mentioned image recognition processing.

The overhead image generation unit 53 generates an overhead image (bird's-eye view image) centering around the hydraulic excavator 1 by performing the image processing on a plurality of images captured by a plurality of cameras (right camera 51a, left camera 51b, rear camera 51c) of the image capturing unit 51. Namely, the monitoring unit 50 has the overhead image generation unit 53 to generate the overhead image by performing the image processing on the plurality of images captured by the plurality of cameras.

The image processor 52 and the overhead image generation unit 53 described above consist of a central processing unit called a CPU (Central Processing Unit) or a computing device such as a GPU (Graphics Processing Unit), for example.

As long as the obstacle can be detected by the monitoring unit 50 within a given range, the number of cameras, an installation location, and an installation method are not particularly limited. The system may also be configured to detect obstacles using an obstacle sensor instead of a camera. As the obstacle sensor, any known distance measuring device capable of acquiring distance information of the obstacle can be applied. For example, an ultrasonic radar using ultrasonic waves, a millimeter wave radar using millimeter wave band radio waves, a LIDER that measures a scattered light in response to laser radiation thereby to calculate a distance, and a stereo camera which is provided with plural cameras and measures the distance from a taken image to an object can be used as the obstacle sensor. When an obstacle sensor is used, the position information of an obstacle can be obtained based on the phase difference information of the light emission/reception timing when the light is emitted, and the presence of an obstacle can be determined based on the light intensity information when the light is received.

The monitoring unit 50 also monitors a state around the hydraulic excavator 1 in a plurality of monitoring segments which are segmented according to each distance from the hydraulic excavator 1. For example, the image processor 52 can detect obstacles based on the above mentioned images and obtain the distance of the obstacle from the hydraulic excavator 1 by means of the image processing. If the monitoring range around the hydraulic excavator 1 is divided into two monitoring segments, D1 and D2, where D1 is a monitoring segment having a radius of less than 2 m centering around the hydraulic excavator 1 and D2 is a monitoring segment having a radius from 2 m to 3 m, the image processor 52 can determine which of the two monitoring segments, D1 and D2, the detected obstacle belongs to based on the distance of the obstacle from the hydraulic excavator 1. Namely, the monitoring unit 50 can monitor whether or not obstacles are present in the multiple monitoring segments D1 and D2. The monitoring unit 50 may obtain the distance of the obstacle from the hydraulic excavator 1 by the obstacle sensor described above, and determine which of the two monitoring segments, D1 and D2, the detected obstacle belongs to.

2-2. Controller

The controller 60 controls operation of each part of the hydraulic excavator 1. Such the controller 60 is configured as an electronic control unit referred as to an ECU (Electronic Control Unit). The controller 60 may include a storage unit. The storage unit stores a program and various information to run the controller 60. A RAM (Random Access Memory), a ROM (Read Only Memory), and the like can be used as the storage unit mentioned above.

2-3. Monitor

The monitor 70 is located in the vicinity of (e.g., diagonally forward of) the operator's seat 41a and displays various types of information to provide necessary information to the operator sitting on the operator's seat 41a. The monitor 70 has a display unit 71 and an input 72. The monitor 70 itself may have an ECU (monitor ECU) inside, and it may be configured so that the monitor ECU controls each part of the monitor 70.

The display unit 71 consists of a liquid crystal display device to display various types of information, for example. For example, the display unit 71 displays an image obtained by the monitoring unit 50. Namely, the hydraulic excavator

1 includes a display unit 71 to display the image obtained by the monitoring unit 50. The display unit 71 also displays alarm information indicating the presence of an obstacle when the monitoring unit 50 detects that the obstacle is present around the hydraulic excavator 1. A display screen of the display unit 71 is described in more detail below.

The operator can operate the input 72 to set and input various types of information. The input 72 consists of a touch panel input device which is superimposed on the display unit 71, for example. The input 72 may consist of mechanical input buttons or a jog dial. The display screen of the display unit 71 can also be switched (e.g., between a screen shown in FIG. 4 and a screen shown in FIG. 6) by the operator operating the input 72 (e.g., pressing a predetermined position).

2-4. Rotary Lamp, Light Emitter, Sounding Unit

A rotary lamp 81 shown in FIG. 2 consists of a lamp which rotates when the monitoring unit 50 detects the obstacle. A light emitter 82 consists of, for example, a light-emitting diode (LED) which lights up or blinks when the monitoring unit 50 detects the obstacle. A sounding unit 83 consists of a buzzer which makes a sound when the monitoring unit 50 detects the obstacle. The sounding unit 83 may consist of an audio output unit which outputs voice (electronic sound) when the monitoring unit 50 detects the obstacle. The rotation of the rotary lamp 81, the lighting up (or blinking) of the light emitter 82, and the output of a buzzer sound or voice of the sounding unit 63 allow the operator to recognize that the monitoring unit 50 detects the obstacle.

As described above, the display unit 71 of the monitor 70, the rotary lamp 81, the light emitter 82, and the sounding unit 83 issues an alarm by displaying an icon or the like, rotating a lamp, emitting light, or making a sound, respectively, when the monitoring unit 50 detects the obstacle. Accordingly, it can be said that the display unit 71, the rotary lamp 81, the light emitter 82, and the sounding unit 83 constitute an alarm device 90 which issues an alarm based on the monitoring result of the monitoring unit 50. Namely, the hydraulic excavator 1 includes the alarm device 90 which issues an alarm based on the monitoring result of the monitoring unit 50. The alarm device 90 only has to include at least one of the display unit 71, the rotary lamp 81, the light emitter 82, and the sounding unit 83, not necessarily all of them.

3. Hydraulic Circuit

Next, a hydraulic circuit of the hydraulic excavator 1 is described with reference to FIGS. 1 and 2. The hydraulic excavator 1 includes a plurality of hydraulic actuators AC, a hydraulic pump P0 which pumps pressure oil to the plurality of hydraulic actuators AC, and a pilot pump PP. For the convenience of explanation, FIG. 2 shows a hydraulic circuit corresponding to one hydraulic actuator AC, but a similar hydraulic circuit is configured for another hydraulic actuator AC.

The plurality of hydraulic actuators AC consists of right and left traveling motors 22 which are hydraulic actuators for traveling to drive the lower traveling body 2, the blade cylinder 23a which is a hydraulic actuator to rotate the blade 23 vertically, the revolving motor 43 which is a hydraulic actuator for revolving to drive the upper revolving body 4, and the boom cylinder 31a, arm cylinder 32a and bucket cylinder 33a each of which is a hydraulic actuator for work to drive the work machine 3. The blade cylinder 23a, the boom cylinder 31a, the arm cylinder 32a, and the bucket cylinder 33a are collectively referred to as a hydraulic cylinder CY.

The hydraulic excavator 1 may be configured so as to have a so-called boom swing function which swings the work machine 3 (boom 31) in a right-left direction relative to the upper revolving body 4. When the hydraulic excavator 1 has the boom swing function, the hydraulic cylinder CY also includes a swing cylinder which is a hydraulic actuator to swing the boom 31. In general, the boom swing function is applied to a mini excavator (small hydraulic excavator) used for construction in a narrow place.

The plurality of hydraulic pumps P0 consist of a variable displacement pump and a fixed displacement pump, and is driven by the engine 40. The variable displacement pump pumps the pressure oil to the right and left traveling motors 22, the boom cylinder 31*a*, the arm cylinder 32*a* and the bucket cylinder 33*a*. The fixed displacement pump supplies the pressure oil to the blade cylinder 23*a*, the revolving motor 43, and a swing cylinder (not shown).

Each of the plurality of actuators AC is provided with a corresponding direction switching valve CV. The direction switching valve CV is a pilot-type direction switching valve to switch the direction and flow rate of the pressure oil pumped from the hydraulic pump P0 (variable displacement pump or fixed displacement pump), also called a control valve. The direction switching valve CV according to the present embodiment include, for example, a direction switching valve corresponding to the right and left traveling motors 22, a direction switching valve corresponding to the boom cylinder 31*a*, a direction switching valve corresponding to the arm cylinder 32*a*, a direction switching valve corresponding to the bucket cylinder 33*a*, a direction switching valve corresponding to the blade cylinder 23*a*, a direction switching valve corresponding to the revolving motor 43, and a direction switching valve corresponding to the swing cylinder.

The pilot pump PP discharges pilot oil which serves as an input order to the direction switching valve CV. The pilot pump PP driven by the engine 40 discharges the pressure oil, thereby to generate pilot pressure in a pilot oil path. The hydraulic excavator 1 is provided with the pilot oil paths leading to each of the direction switching valves CV from the pilot pump PP.

The manipulation unit 41*b* has a remote control valve RV for switching the direction and pressure of the pressure oil supplied to the direction switching valve CV. The pressure oil discharged from the pilot pump PP is supplied to the remote control valve RV. The remote control valve RV generates the pilot pressure according to the operating direction and operating amount of the manipulation unit 41*b*. The manipulation unit 41*b* includes a traveling lever to cause the hydraulic excavator 1 to travel and an operation lever to operate the work machine 3, for example.

A solenoid valve SV is provided in the oil path between the pilot pump PP and each remote control valve RV. In response to instructions for control from the controller 60, the solenoid valve SV adjusts the pilot pressure generated by the pilot pump PP. Adjusting the pilot pressure allows the plural hydraulic actuators AC to simultaneously stop the driving thereof as well as to uniformly control the drive speeds thereof, for example.

4. Details of Display Screen of Display Unit

Figure 3:
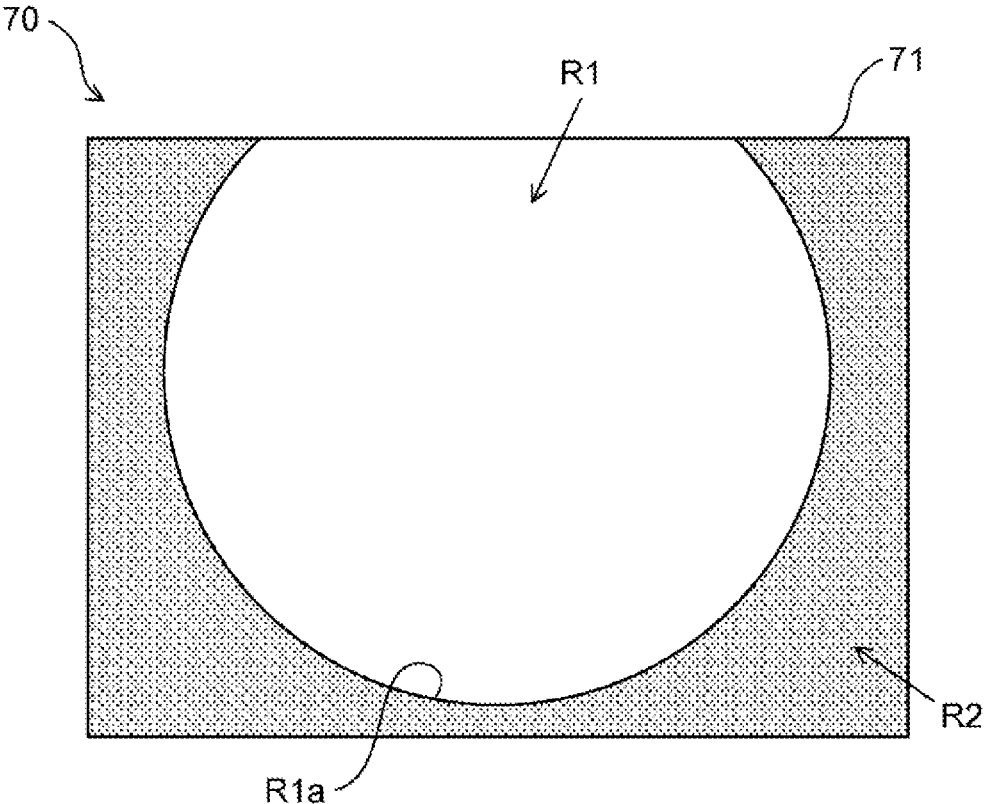
FIG. 3 is an explanatory diagram illustrating an example of each display area on a display screen of a display unit of the hydraulic excavator.

Next, a display screen of the display unit 71 mentioned above is described in detail. FIG. 3 shows an example of each display area on the display screen of the display unit 71. The display unit 71 has an image display area R1 and an alarm information display area R2. The display of information in the image display area R1 and the alarm information display area R2 of the display unit 71 is controlled by the controller 60.

The image display area R1 is the area where the image obtained by the monitoring unit 50 is displayed. The "image obtained by the monitoring unit 50" indicates the overhead image By (see FIG. 4) generated by the overhead image generation unit 53 of the monitoring unit 50, for example. The alarm information display area R2 is the area where alarm information W (see FIG. 4) indicating the presence of the obstacle is displayed when the monitoring unit 50 detects that the obstacle is present.

Namely, the display unit 71 has the image display area R1 for displaying an image obtained by the monitoring unit 50 and the alarm information display area R2 for displaying the alarm information W indicating the presence of the obstacle when the monitoring unit 50 detects that the obstacle is present.

In the present embodiment, the alarm information display area R2 is located outside the image display area R1 in the display unit 71. Furthermore, the alarm information display area R2 is located adjacent to the image display area R1 in the display unit 71.

Figure 4:
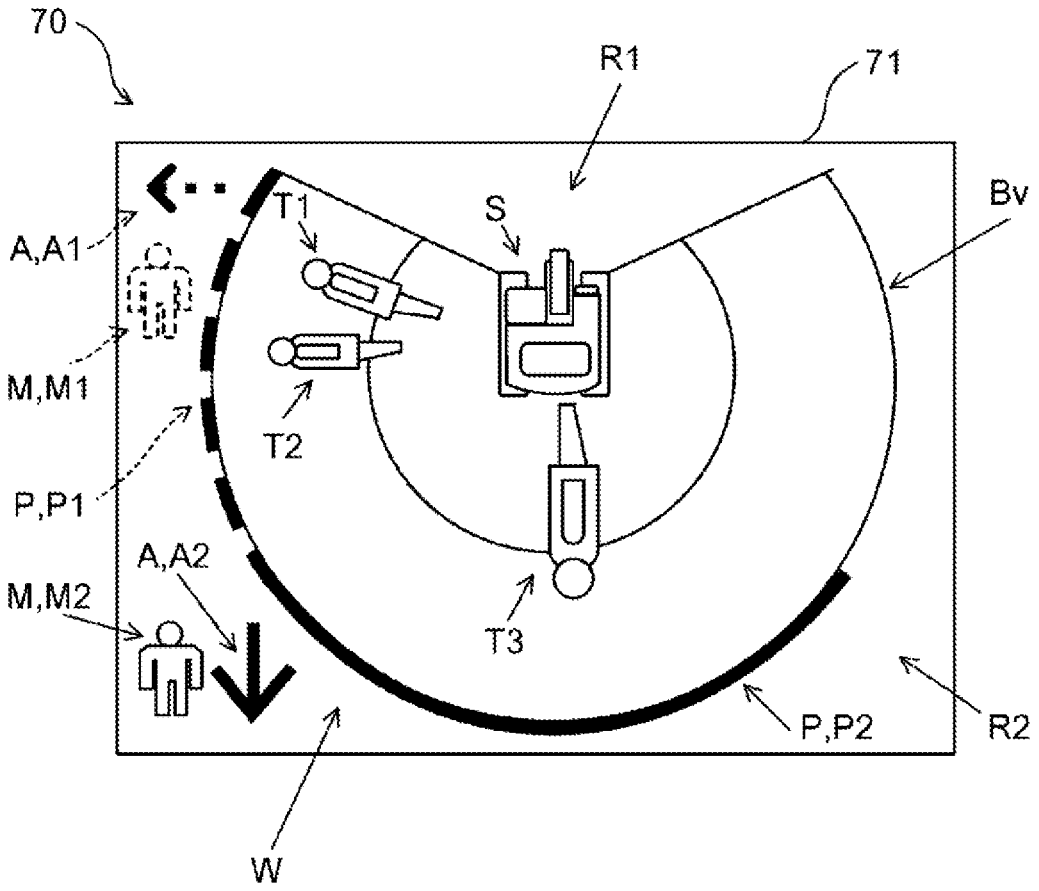
FIG. 4 is an explanatory diagram illustrating a display example of the display unit.

FIG. 4 shows the display unit 71 in which the overhead image By is displayed in the image display area R1 and the alarm information W is displayed in the alarm information display area R2. The overhead image By displayed in the image display area R1 includes images T1-T3 of humans imaged in the image as obstacles. The image display area R1 also displays a vehicle image S showing the hydraulic excavator 1. Accordingly, the display unit 71 displays the overhead image By together with a vehicle image S which shows the hydraulic excavator 1 in the image display area R1.

The alarm information W displayed in the alarm information display area R2 includes strip-shaped information P, direction information A, and type information M.

The strip-shaped information P is information that is displayed in a strip shape along a circumferential edge R1*a* (see FIG. 3) of the image display area R1. As shown in FIG. 4, humans (see T1 and T2) are imaged in the overhead image By, which is displayed in the image display area R1, on the left side of the hydraulic excavator 1, so that in the alarm information display area R2, the strip-shaped information P1 is displayed at a position corresponding to the humans on the left side of the hydraulic excavator 1 in an arc shape along the circumferential edge R1*a* of the image display area R1. In addition, another human (see T3) is also imaged in the overhead image By at a position behind the hydraulic excavator 1, so that in the alarm information display area R2, the strip-shaped information P2 is displayed at a position corresponding to the human behind the hydraulic excavator 1 in an arc shape along the circumferential edge R1*a* of the image display area R1. Accordingly, the alarm information W includes the strip-shaped information P (P1, P2) that is displayed in a strip shape along the circumferential edge R1*a* of the image display area R1.

The "position corresponding to something on the left side of the hydraulic excavator 1 in the alarm information display area R2" only has to be any position where the operator can recognize that the display position of the strip-shaped information P1 in the alarm information display area R2 is "on the left of the vehicle image S showing the hydraulic excavator 1," and the direction may not be limited to the strictly left side. For example, "a position corresponding to something on the left side" includes positions on the diagonally forward left or diagonally backward left side in addition to the strictly left side. Thus, in the following description, for example, it is assumed that "positions corresponding to something on the rear side" include positions on the diagonally left rear or diagonally right rear side in addition to the strictly rear side, and "positions corresponding to something on the right side" include positions on the diagonally forward right or diagonally backward right side in addition to the strictly right side.

The direction information A is information indicating the direction of obstacles imaged in the image (e.g., overhead image By) as viewed from the hydraulic excavator 1. As shown in FIG. 4, the humans are imaged in the overhead image By on the left side of the hydraulic excavator 1, so that an icon of a left arrow is displayed as direction information A1 at a position corresponding to the humans on the left side of the hydraulic excavator 1 in the alarm information display area R2. In addition, another human is also imaged in the overhead image By behind the hydraulic excavator 1, so that an icon of a back arrow is displayed as direction information A2 at a position corresponding to the human on the rear side of the hydraulic excavator 1 in the alarm information display area R2. Thus, the alarm information W includes the direction information A indicating the direction of the obstacle imaged in the image obtained by the monitoring unit 50, relative to the hydraulic excavator 1.

The type information M is information indicating the type of obstacle detected by the image processor 53 of the monitoring unit 50. If the image processor 53 detects "humans" of being obstacles on the left side of the hydraulic excavator 1 by performing the image processing, an icon indicating that the detected obstacles are "humans" is displayed as type information M1 at a position corresponding to the humans on the left side of the hydraulic excavator 1 in the alarm information display area R2. If the image processor 53 detects a "human" of being an obstacle behind the hydraulic excavator 1 by performing the image processing, an icon indicating that the detected obstacle is a "human" is displayed as type information M2 in a position corresponding to the human on the rear side of the hydraulic excavator 1 in the alarm information display area R2. Thus, the alarm information W includes the type information M indicating the type of the obstacle detected by the image processor 53.

As described above, since the alarm information W is displayed at a position corresponding to an obstacle in a direction viewed from the hydraulic excavator 1 in the alarm information display area R2, it can be said that the display unit 71 displays the alarm information W as follows. Namely, if the monitoring unit 50 detects the presence of an obstacle, the display unit 71 displays the alarm information W at a position corresponding to the obstacle imaged in the image in a direction viewed from the hydraulic excavator 1 in the alarm information display area R2.

In the present embodiment, the monitoring unit 50 monitors the state around the hydraulic excavator 1 in multiple monitoring segments D1 and D2, as described above. Therefore, if the monitoring unit 50 detects the presence of the obstacle, the display unit 71 displays the alarm information W in a color corresponding to the monitoring segment in which the obstacle is present. For example, if the monitoring unit 50 detects the obstacle in the monitoring segment D1 (a range of less than 2 m radius from the hydraulic excavator 1), the display unit 71 displays the alarm information W in red, for example. On the other hand, if the monitoring unit 50 detects an obstacle in the monitoring segment D2 (a range of from 2 m to 3 m radius from the hydraulic excavator 1), the display unit 71 displays the alarm information W in yellow, for example.

Namely, if the monitoring unit 50 detects the obstacle in the monitoring segment D1, which has a high risk of contact between the obstacle and the hydraulic excavator 1, among the monitoring segments D1 and D2 set in advance, red color is adopted to the alarm information W. On the other hand, if the monitoring unit 50 detects the obstacle in the monitoring segment D2 in which the risk of contact between the obstacle and the hydraulic excavator 1 is not high, from among the monitoring segments D1 and D2, but an attention should be paid, yellow color is adopted to the alarm information W.

As shown in FIG. 4, for example, if "humans" of being obstacles are detected in the monitoring segment D2 on the left side of the hydraulic excavator 1, the strip-shaped information P1, direction information A1 and type information M1 as the alarm information W are displayed in yellow. Furthermore, if a "human" of being an obstacle is detected in the monitoring segment D1 behind the hydraulic excavator 1, the strip-shaped information P2, direction information A2 and type information M2 as the alarm information W are displayed in red. For the convenience of explanation, in FIG. 4, the alarm information W colored in yellow is indicated by a dashed line, and the alarm information W colored in red is indicated by a solid line.

In the present embodiment, as shown in FIGS. 3 and 4, the alarm information display area R2 is located outside the image display area R1 in the display unit 71. Therefore, even if the obstacles imaged in the image (e.g., overhead image By) displayed in the image display area R1 are very small compared to the entire image, the alarm information W indicating the presence of the obstacles can be displayed relatively large in the alarm information display area R2 with being clearly distinguished from the image mentioned above. For example, the strip-shaped information P1 in the alarm information W can be displayed larger (wider) than images T1 and T2 in the alarm information display area R2. Similarly, the strip-shaped information P2 in the alarm information W can be displayed larger (wider) than the image T3. Such a display of the alarm information W makes it easy for the operator to intuitively know the presence of obstacles around the hydraulic excavator 1. As a result, it is possible for the operator to easily know danger such as collision between the hydraulic excavator 1 and pay attention thereto.

Furthermore, in the present embodiment, since the display unit 71 is configured such that the alarm information display area R2 is adjacent to the image display area R1, a distance between the alarm information display area R2 and the image display area R1 is small. This makes it easier for the operator to check the image displayed in the image display area R1 to confirm the presence of obstacles immediately after seeing the alarm information W when the alarm information W is displayed in the alarm information display area R2.

Furthermore, In the display area R2, the display unit 71 displays the alarm information W at a position corresponding to the obstacle imaged in the image (e.g., the overhead image By) in a direction viewed from the hydraulic excavator 1 in the alarm information display area R2. This allows the operator to easily and intuitively know the direction of the obstacles viewed from the hydraulic excavator 1 based on the display position of the alarm information W in the alarm information display area R2. For example, in the example shown in FIG. 4, the operator can easily and intuitively know that the direction of the obstacles is on the left side of the hydraulic excavator 1 based on the display position of the strip-shaped information P1, direction information A1, and type information M1 as the alarm information W. The operator can easily and intuitively know that the direction of the obstacle is behind the hydraulic excavator 1 based on the display position of the strip-shaped information P2, direction information A2, and type information M2 as the alarm information W.

In addition, since the strip-shaped information P is displayed as a strip shape along the circumferential edge R1a of the image display area R1, it is easy for the operator to see and know it. Therefore, since the alarm information W includes the strip-shaped information P, this makes it easier for the operator to know the presence of obstacles based on the strip-shaped information P.

In addition, the alarm information W includes the direction information A. This allows the operator to easily and intuitively know the direction of the obstacles relative to the hydraulic excavator 1 upon seeing the direction information A displayed. For example, in the example shown in FIG. 4, the operator can easily and intuitively know the direction of the obstacles is on the left side of the hydraulic excavator 1 upon seeing the direction information A1 as the alarm information W. Furthermore, the operator can easily and intuitively know that the direction of the obstacle is behind the hydraulic excavator 1 upon seeing the direction information A2 as the alarm information W.

If the monitoring unit 50 detects the presence of an obstacle, the display unit 71 displays the alarm information W in colors corresponding to the monitoring segments D1 and D2 in which the obstacle is present. By seeing the color of the alarm information W displayed, the operator can immediately determine which monitoring segment the obstacle detected by the monitoring unit 50 belongs to. The operator can then intuitively know whether the obstacle is close to the hydraulic excavator 1 or not, and easily know the degree of danger.

The monitoring unit 50 has the image capturing unit 51 and the image processor 52. The image processor 52 detects whether or not the obstacle is present around the hydraulic excavator 1 by performing image recognition processing on the images captured by the image capturing unit 51. Thus, the monitoring unit 50 to monitor the state around the hydraulic excavator 1 can be realized without obstacle sensors. Namely, it is possible to realize the monitoring unit 50 simply configured without obstacle sensors.

In addition, the alarm information W includes the type information M. This allows the operator to easily know the type of obstacle (e.g., human/animal/other) present around the hydraulic excavator 1 upon seeing the type information M displayed.

In the image display area R1, the display unit 71 displays an overhead image By together with a vehicle image S showing the hydraulic excavator 1. In this case, by viewing both the vehicle image S and the overhead image By, the operator can easily know the position of the obstacle relative to the hydraulic excavator 1 when it appears in the overhead image By.

5. Supplemental Description

Figure 5:
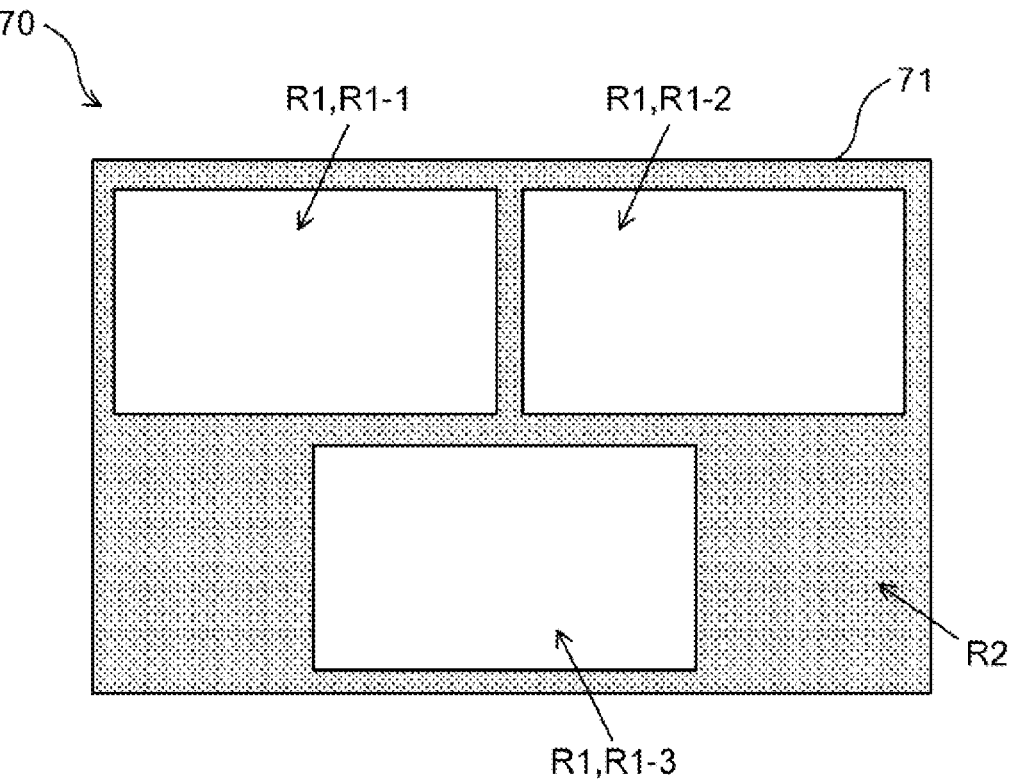
FIG. 5 is an explanatory diagram illustrating another example of each display area on the display screen of the display unit.

FIG. 5 is an explanatory diagram illustrating another example of each display area on the display screen of the display unit 71. The image display area R1 of the display unit 71 may include a plurality of image display areas R1-1 to R1-3. The image display areas R1-1 to R1-3 display images obtained by the monitoring unit 50. In more detail, the image display areas R1-1 to R1-3 display the camera images Cv-1 to Cv-3 (see FIG. 6), which are captured by the left camera 51a, right camera 51b, and rear camera 51c constituting the image capturing unit 51 of the monitoring unit 50, respectively. The display unit 71 has the same configuration as the example shown in FIGS. 3 and 4 in that the alarm information display area R2 is located outside the image display area R1 (R1-1 to R1-3) and that the alarm information display area R2 is located adjacent to the image display area R1 (R1-1 to R1-3), etc.

Figure 6:
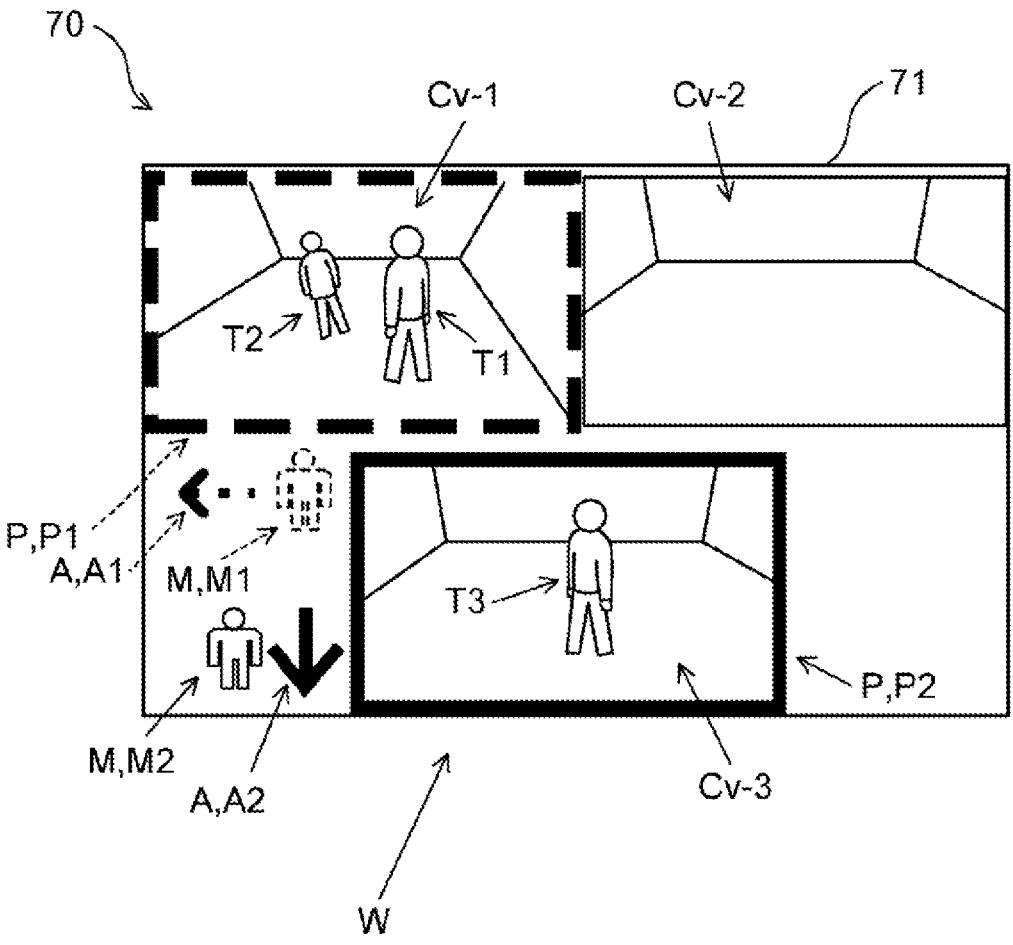
FIG. 6 is an explanatory diagram illustrating another display example of the display unit.

Thus, even if the image display area R1 includes multiple image display areas R1-1 to R1-3, similar to the example shown in FIG. 4, the display unit 71 can display the alarm information W at a predetermined location in the alarm information display area R2. FIG. 6 is an explanatory diagram illustrating another display example of the display unit 71. If "humans" of being obstacles are imaged in the camera image Cv-1 captured by the left camera 51a and the monitoring unit 50 detects the obstacles, the display unit 71 can display the alarm information W (strip-shaped information P1, direction information A1, and type information M1) at a position (e.g., in the vicinity of the image display area R1-1) corresponding to the obstacles imaged in the camera image Cv-1 in a direction viewed from the hydraulic excavator 1 in the alarm information display area R2. Similarly, if a "human" being of an obstacle is imaged in the camera image Cv-3 captured by the rear camera 51c and the monitoring unit 50 detects the obstacle, the display unit 71 can display the alarm information W (strip-shaped information P2, direction information A2, and type information M2) at a position (e.g., in the vicinity of the image display area R1-3) corresponding to the obstacle imaged in the camera image Cv-3 in a direction viewed from the hydraulic excavator 1 in the alarm information display area R2.

In FIG. 6, the strip-shaped information P (P1, P2) as the alarm information is displayed in a frame shape surrounding the entire boundary of the camera images Cv-1 and Cv-3. In this case, the correspondence between the camera images Cv-1 and Cv-3 and the strip-shaped information P1 and P2 is clear, so that the operator can easily know the direction of the obstacle viewed from the hydraulic excavator 1 upon seeing the alarm information W (strip-shaped information P1 and P2). The strip-shaped information P may be displayed as a strip shape along only a portion of the boundary of the camera image Cv-1, etc.

In the present embodiment, the hydraulic excavator 1 which is the construction machine is described as an example of the work vehicle, but the work vehicle is not limited to the hydraulic excavator, and may be any other construction machine such as wheel loader, or an agricultural machine such as combine harvester. Namely, the display method of the display unit 71 described in the present embodiment can be applied to any construction equipment and agricultural machinery other than the hydraulic excavator 1.

The embodiment of the present invention has been described above, but the scope of the invention is not limited thereto. The invention can be carried out within an extended or modified range without departing from the gist of the invention.

INDUSTRIAL APPLICABILITY

The present invention is applicable to a work vehicle such as a construction machine and an agricultural machine, for example.

DESCRIPTION OF REFERENCE NUMERALS

1 Hydraulic excavator (work vehicle)
50 Monitoring unit

51 Image capturing unit

51*a* Left camera (image capturing unit, camera)

51*b* Right camera (image capturing unit, camera)

51*c* Rear camera (image capturing unit, camera)

52 Image processor

53 Overhead image generation unit

71: Display unit

Bv Overhead image

Cv-1, Cv-2, Cv-3 Camera image

A, A1, A2 Direction information

M, M1, M2 Type Information

P, P1, P2 Strip-shaped information

D1, D2 Monitoring segment

R1, R1-1, R1-2, R1-3 Image display area

R2 Alarm information display area

W Alarm information

The invention claimed is:

1. A work vehicle comprising:

a monitoring unit that captures an image around the work vehicle and detects whether or not an obstacle is present around the work vehicle, thereby to monitor a state around the work vehicle; and a display unit to display the image obtained by the monitoring unit, wherein the display unit includes:

an image display area that displays the image; and an alarm information display area that displays alarm information indicating a presence of the obstacle in the image when the monitoring unit detects that the obstacle is present, wherein the alarm information in the alarm information display area corresponds to what and where the obstacle is in the image, the alarm information includes strip-shaped information that is displayed in a strip-like shape along an edge of the image display area, and a type information of the obstacle is displayed adjacent to the strip-like shape outside of the image display area, and an icon indicating the direction of the obstacle is displayed alongside the type information.

2. The work vehicle according to claim 1, wherein the alarm information display area is located adjacent to the image display area in the display unit.

3. The work vehicle according to claim 1, wherein when the monitoring unit detects the presence of the obstacle, the display unit displays the alarm information at a position in the alarm information display area, corresponding to the obstacle imaged in the image in a direction relative to the work vehicle.

4. The work vehicle according to claim 1, wherein the alarm information includes direction information indicating the direction of the obstacle imaged in the image relative to the work vehicle.

5. The work vehicle according to claim 1, wherein the monitoring unit monitors the state around the work vehicle in a plurality of monitoring segments that are segmented according to a distance from the work vehicle, and when the monitoring unit detects the presence of the obstacle, the display unit displays the alarm information in a color corresponding to the monitoring segment in which the obstacle is present.

6. The work vehicle according to claim 1, wherein the monitoring unit includes:

an image capturing unit to capture the image; and an image processor to detect whether or not the obstacle is present around the work vehicle by performing image recognition processing on the image captured by the image capturing unit.

7. The work vehicle according to claim 6, wherein the image processor further detects the type information of the obstacle by means of the image recognition processing, and the alarm information includes the type information indicating the type of the obstacle detected by the image processor.

8. The work vehicle according to claim 6, wherein the image capturing unit includes a plurality of cameras to capture images around the work vehicle, the monitoring unit includes an overhead image generation unit to generate an overhead image by performing image processing on the images captured by the plurality of cameras, and the display unit displays in the image display area the overhead image together with a vehicle image indicating the work vehicle.

* * * * *